June 6, 1950 E. C. BENTSEN 2,510,369
RECIPROCATING MIXING VALVE
Filed Sept. 7, 1948
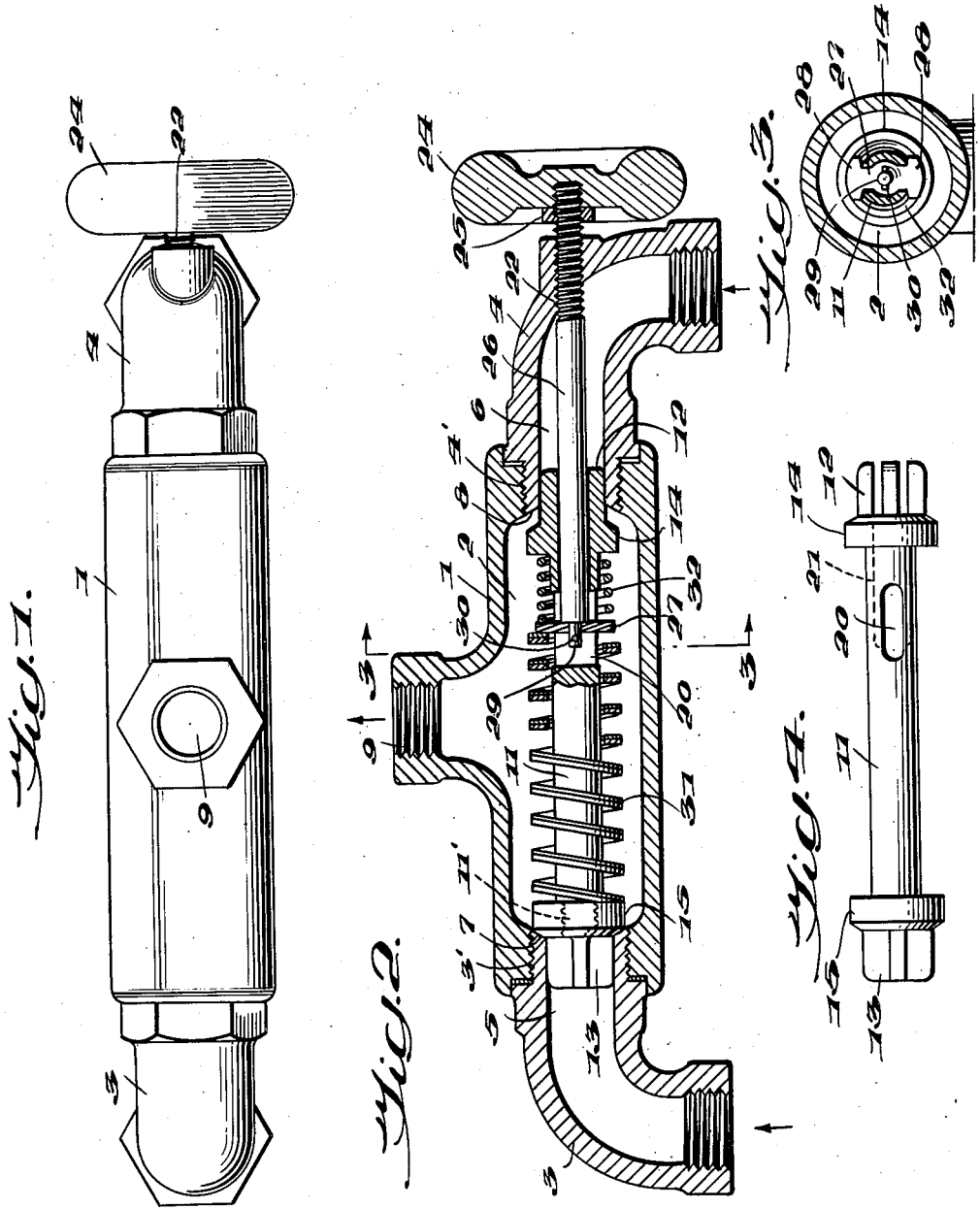
Inventor
ELMER C. BENTSEN,
By Babcock & Babcock
Attorneys Patented June 6, 1950

2,510,369

UNITED STATES PATENT OFFICE 2,510,369

RECIPROCATING MIXING VALVE

Elmer C. Bentsen, Mission, Tex.

Application September 7, 1948, Serial No. 47,956

12 Claims. (Cl. 236—12)

This invention relates to a thermostatically controlled fluid mixing valve of the reciprocating type for regulating the proportionate rates of flow of two different streams of fluid at different temperatures into a mixing chamber to maintain a substantially constant temperature of the mixed fluid in said chamber.

Although many fluid mixing valves of this general type have heretofore been known and used, these in general have embodied comparatively complicated and expensive constructions, requiring means separate from the valve ports for mounting the valve mechanism in operative relation thereto, and requiring additional provision for mounting and regulating the thermostat element. Further, in most cases the working mechanisms of such prior valves have been relatively bulky, requiring that the valve body or casing be provided with relatively large removable cover plates or similar means which must be removed in order to permit assembly and removal of the said mechanisms.

The present invention has been conceived and perfected with the foregoing in mind, and accordingly has for its broad object the provision of such a valve which is of extremely simplified and economical construction, and also efficient in operation.

A more specific object is to provide such a valve in which the valve ports are utilized as the sole guiding and supporting means for the valve plunger, thereby eliminating the necessity for providing separate guiding and supporting means, the thermostatic actuating means in turn being carried by the valve plunger.

A further object is to provide such a valve in which one of the ports thus cooperating with the valve plunger is also utilized as a passageway for adjusting or regulating means for controlling the temperature setting of the valve.

A further object is to provide such a valve in which one of the fluid inlet ports is defined by a ported fitting threaded into an opening in the main casing section, and wherein all of the working parts or mechanism of the valve may be inserted in and removed from the mixing chamber as an assembled unit through said opening.

A still further object is to provide a novel compact arrangement of the working parts of the valve embodying a highly novel and efficient means for adjusting same to maintain different temperatures of fluid in the mixing chamber, as desired.

With the foregoing objects and advantages in mind, the valve casing of the invention is formed with relatively aligned hot and cold fluid inlet ports opening into its mixing chamber. The valve plunger of the invention extends through the mixing chamber between these two ports with its opposite ends slidably supported therein, the plunger being provided with valve plugs or enlargements for cooperation with these respective ports. Between these valve plugs the plunger is provided with an axially extending slot through which is disposed a normally fixed retainer or abutment. A helical thermostat or other suitable thermostatic element is disposed in engagement with the retainer and plunger respectively to cause axial movement of the plunger responsive to changes in temperature of the fluid within the mixing chamber and, if desired a balancing spring may be associated with the thermostat to facilitate the action thereof.

In order to provide for changing the temperature setting of the valve, provision is made for axially shifting the position of the normally fixed retainer aforementioned. Preferably this is accomplished by an adjusting screw which is rotatably threaded through the wall of the valve casing with its inner end projecting coaxially through a bore in the adjacent end of the plunger to support the retainer in said slot.

In order to permit convenient assembly of the various valve parts, one of the inlet ports thereof is defined by a ported fitting threaded into an opening in the main casing section, the adjusting screw being threaded through this fitting, and the overall diameter of the assembled working parts of the valve being somewhat smaller than the said opening to the end that said parts may be removed and replaced as an assembled unit through this opening.

In this application I show and describe only the preferred embodiment of my invention, simply by way of illustration of the practice thereof, as by law required. However, I recognize that my invention is capable of other and different embodiments, and that the several details thereof may be altered in various ways, all without departing from my said invention. Accordingly, the drawings and description herein are to be considered as merely illustrative, and not as exclusive.

In the accompanying drawings:

Figure 1 represents a plan view of a mixing valve embodying the invention;

Figure 2, a vertical axial section through said valve;

Figure 3, a section on the line 3—3 of Figure 2, looking in the direction of the arrows; and Figure 4, a detail plan view of the valve plunger utilized in the preferred embodiment of the invention.

Referring now in detail to the accompanying drawings, the valve casing of the invention preferably comprises a hollow metal T-fitting 1, the hollow interior of which functions as a mixing chamber 2, and hollow or ported elbow fittings 3 and 4 respectively threaded into relatively aligned threaded bores 3' and 4' respectively of the said T-fitting 1. These elbow fittings 3 and 4 are formed with passages 5 and 6 respectively therethrough, the inner ends of these passages being in relative axial alignment and opening into opposite ends of the mixing chamber 2 to function as hot and cold fluid inlet ports respectively for the valve chamber. Preferably the inner end faces of these fittings surrounding the inlet ports 5 and 6 will be bevelled to form valve seats 7 and 8.

The remaining opening 9 in the T-fitting 1 functions as the outlet port for the mixing chamber 2 and communicates with the chamber 2 at a location medially between the inlet ports 5 and 6.

The outer ends of the ports or passages 5 and 6 are internally threaded or otherwise adapted in usual manner for connection to usual hot and cold fluid supply lines or sources respectively, and the outer end of the discharge port or passage 9 may be similarly adapted for connection to a conduit or line adapted to convey the discharged fluid to its destination.

Disposed in the chamber 2 to control the flow of fluid thereinto through the ports 5 and 6 is a valve plunger, designated 11 in its entirety, which extends through the chamber 2 between the inlet ports 5 and 6 and has its opposite ends formed as pilots or guides 12 and 13 respectively slidably disposed in said ports. The ends or guides aforesaid are formed of any suitable cross-sectional shape different from that of the respective ports 5 and 6, or otherwise arranged to avoid excessive obstruction or stoppage of the fluid flow through said ports. To this end the guides 13 and 12 in the preferred embodiment are formed as radial wings disposed in relative angular axial planes.

Carried by the plunger 11 adjacent the respective guides 12 and 13 and preferably forming an integral part of the plunger construction, are valve plugs 14 and 15 adapted and disposed to cooperate with the respective valve seats 8 and 7, responsive to axial movement of the plunger, thereby varying the relative rates of flow of fluid through these inlet ports 6 and 5.

Preferably the plunger 11 is of reduced diameter between the plugs 14 and 15, and at a location medially between said plugs the plunger is formed with an axial slot 20 extending therethrough. An axial bore 21 extends into said plunger 11 through one axial end thereof to communicate with the slot 20.

A normally fixed element 22, preferably in the form of an adjusting screw, is carried by and preferably rotatably threaded through one of the elbow fittings 4 from the exterior of the casing with its inner end extending coaxially through the inlet port 6 and into the mixing chamber 2, to be slidably and rotatably received in the bore 21 of the plunger 11. Preferably the said inner end of the element 22 is in the form of a smooth cylindrical shank which is telescopically disposed within the bore 21, and capable of supporting the plunger 11 in operative position relative to the ports 5 and 6, should this be desired.

Suitable means for actuating the adjusting screw 22 from the exterior of the valve casing may comprise a hand wheel 24 threaded onto the exterior end of the said screw and secured thereon against relative rotation by suitable means such as a jam nut 25.

Connecting means in any of various forms may be provided for establishing an operative connection through the slot 20 between the element 22 and the hereinafter described thermostat means disposed exteriorly of the element 22. In the preferred embodiment such connecting means comprises a transverse retainer or pin 27 disposed through the slot 20 and rotatably carried by the shank 26 of the adjusting screw; the inner end of the shank 26 being formed with a reduced axial extension 29 on which the retainer is pivoted and a securing pin 30 being passed through the outer end of this extension to cooperate with the adjacent end of the shaft 26 in preventing axial displacement of the retainer 27.

If desired, the projecting ends 28 of the retainer may be somewhat enlarged circumferentially, as shown in Figure 3, to provide increased areas of engagement for the cooperating plunger actuating means.

Such actuating means comprises a spiral bimetallic thermostat 31 disposed coaxially about the plunger 11 under axial compression between the retainer 27 and one of the valve plugs 15, while a helical balancing or compensating spring 32 is preferably disposed coaxially about the plunger 11 under axial compression between the retainer 27 and the other valve plug 14.

In order to facilitate the assembly of the thermostat 31 and spring 32 on the plunger 11, it will be desirable to form one of the valve plugs 15 and its adjacent guide 13 as a separate integral unit or section which is removably threaded or otherwise removably secured to the remainder of the plunger 11, as at 11' in Figure 2.

It will be noted that the maximum diameter of the entire assembly of working parts within the chamber 2, including the plunger 11, thermostat 31, spring 32 and retainer 27 in the preferred embodiment is somewhat less than the internal diameter of the threaded bore 4', thus making it possible to remove or insert all of the said assembly as a unit through the said bore 4'.

It will be seen that the thermostat and spring, 31 and 32 respectively, exert opposing axial forces tending to move the plunger 11 axially relative to the normally stationary element 22 and retainer 27 responsive to variations in the temperature of the fluid in the chamber 2, thus causing the plunger to assume an axial position wherein these opposing forces are balanced, it being understood of course that the thermostat 31 will expand and contract axially responsive to temperature variations.

Thus, in the operation of the invention, with hot water or fluid entering the valve chamber 2 through the inlet port 5 and relatively cold water or fluid entering said chamber through the port 6, should the fluid temperature within the chamber exceed the particular constant temperature for which the valve may be set, the consequent axial expansive force exerted by the thermostat 31 will exceed the opposing force exerted by the spring 32. This will cause the plunger 11 to move axially toward the inlet port 5 to decrease the flow of hot fluid therethrough, while permitting a correspondingly increased flow of cold fluid through the port 6, with resultant lowering of the fluid temperature within the chamber 2.

In the event the temperature within the chamber 2 should drop below that for which the valve is set, the resulting contraction of the thermostat 31 will permit the spring 32 to move the plunger toward the cold fluid inlet port 6, thereby simultaneously decreasing the flow of cold fluid into the chamber 2 and increasing the flow of hot fluid thereinto to raise the resulting temperature of the mixed fluids within the said chamber.

Where it is desired to adjust the valve to maintain a lower temperature in the mixed fluids, the hand wheel 24 may be rotated in a clockwise direction to move the element 22 and retainer 27 axially toward the hot water or fluid port 5. This will cause bodily axial movement of the plunger 11 toward the hot fluid port 5 and away from the cold fluid port 6, thus causing the device to maintain the fluid in chamber 2 at a correspondingly lower temperature.

In order to raise the temperature setting, the hand wheel 24 is simply rotated in the reverse or counterclockwise direction to the desired extent.

It will be apparent that I have provided a novel improved and simplified mixing valve capable of accomplishing the several objects and advantages hereinbefore set forth.

I claim:

1. A thermostatically controlled fluid mixing valve of the reciprocating type comprising, a valve casing embodying a hollow T-fitting having aligned threaded openings thereinto, the interior of said fitting between said openings defining a fluid mixing chamber, and a fluid outlet port opening from said chamber between said threaded openings, ported fittings being threaded into said respective openings to define relatively aligned hot and cold fluid inlet ports; a valve plunger extending between and having its opposite ends slidably supported in said respective inlet ports, valve plugs carried by said plunger for cooperation with said respective inlet ports, said plunger being formed with an axial slot therethrough at a location between said plugs and an axial bore extending through one end thereof into communication with said slot, an adjusting screw rotatably threaded through one of said ported fittings in axial alignment with the inlet port defined thereby, said screw being slidably and rotatably disposed through the bore of said plunger, and a retainer rotatably carried by said screw in said slot for axial adjustment in said mixing chamber; in combination with a helical bimetallic thermostat coaxially disposed on said plunger under compression between said retainer and one of said valve plugs, a helical balancing spring being coaxially disposed on said plunger under compression between said retainer and the other of said valve plugs to exert axial force in opposition to said thermostat, the maximum diameter of said thermostat, spring, retainer and plunger in their assembled relation being smaller than the diameter of the threaded opening receiving said last mentioned ported fitting to permit insertion and removal of said elements in assembled relation through said opening.

2. A thermostatically controlled fluid mixing valve of the reciprocating type comprising, a valve casing embodying a hollow T-fitting having aligned threaded openings thereinto, the interior of said fitting between said openings defining a fluid mixing chamber, and a fluid outlet port opening from said chamber between said openings, ported fittings being threaded into said respective openings to define relatively aligned hot and cold fluid inlet ports; a valve plunger extending between and having its opposite ends slidably supported in said respective inlet ports, valve plugs carried by said plunger for cooperation with said respective inlet ports, said plunger being formed with an axial slot therethrough at a location between said plugs and an axial bore extending through one end thereof into communication with said slot; a retainer support carried by one of said ported fittings and projecting slidably through the bore of said plunger into said slot, and a retainer carried thereby projecting radially from said slot; in combination with a helical bimetallic thermostat coaxially disposed on said plunger under compression between said retainer and one of said valve plugs, a helical balancing spring being coaxially disposed on said plunger under compression between said retainer and the other of said valve plugs to exert axial thrust in opposition to said thermostat, the maximum diameter of said plunger, plugs, thermostat, spring and retainer in their assembled relation being smaller than the diameter of the threaded opening receiving said last mentioned ported fitting to permit insertion and removal of said elements in assembled relation through said opening.

3. A thermostatically controlled fluid mixing valve of the reciprocating type comprising, a valve casing embodying a hollow T-fitting having aligned threaded openings thereinto, the interior of said fitting between said openings defining a fluid mixing chamber, and a fluid outlet port communicating with said chamber between said openings, ported fittings being threaded into said respective openings to define relatively aligned hot and cold fluid inlet ports; a valve plunger extending between and having its opposite ends slidably supported in said respective inlet ports, valve plugs carried by said plunger for cooperation with said respective ports, said plunger being formed with an axial slot therethrough at a location between said plugs and an axial bore extending through one end thereof into communication with said slot; a retainer support carried by one of said ported fittings and projecting slidably through the bore of said plunger into said slot, and a retainer carried thereby in said slot; in combination with a bimetallic thermostat carried by said plunger and thrusting axially against said retainer, a balancing spring carried by said plunger and thrusting against said retainer in opposition to said thermostat, the opposed axial thrusts exerted by said thermostat and said spring causing said plunger to assume an axial position wherein said thrusts balance each other.

4. A thermostatically controlled fluid mixing valve of the reciprocating type comprising, a valve casing embodying a hollow T-fitting having aligned threaded openings thereinto, the interior of said fitting between said openings defining a fluid mixing chamber, and a fluid outlet port communicating with said chamber between said openings, ported fittings being threaded into said respective openings to define relatively aligned hot and cold fluid inlet ports; valve mechanism disposed in said casing comprising, a valve plunger extending between and having its opposite ends slidably supported in said respective inlet ports, valve plugs carried by said plunger for cooperation with said respective ports, said plunger being formed with an axial slot therethrough at a location between said plugs and an axial bore extending through one end thereof into communication with said slot, a retainer support carried by one of said ported fittings and projecting slidably through the bore of said plunger into said slot, and a retainer carried thereby in said slot, in combination with a bimetallic thermostat carried by said plunger and engaging said retainer to vary the axial position of said plunger in accordance with variations in the temperature of said thermostat, and resilient means carried by said plunger and thrusting against said retainer in opposition to said thermostat; the diameter of said valve mechanism being less than that of the threaded opening receiving said last mentioned ported fitting to permit insertion and removal of said mechanism through said opening.

5. A thermostatically controlled fluid mixing valve of the reciprocating type comprising, a valve casing embodying a hollow T-fitting having aligned threaded openings thereinto, the interior of said fitting between said openings defining a fluid mixing chamber, and a fluid outlet port communicating with said chamber between said openings, ported fittings being threaded into said openings to define relatively aligned hot and cold fluid inlet ports, in combination with valve mechanism disposed in said casing comprising, a valve plunger extending between and having its opposite ends slidably supported in said respective inlet ports, valve plugs carried by said plunger for cooperation with said respective inlet ports, said plunger being formed with a medially disposed axial slot therethrough and an axial bore extending through one end thereof into communication with said slot, a retainer support carried by one of said ported fittings and projecting slidably through the bore of said plunger into said slot, a retainer carried thereby in said slot, a bimetallic thermostat carried by said plunger in engagement with said retainer to vary the axial position of said plunger in accordance with temperature variations in the fluids within said mixing chamber, and resilient means carried by said plunger exerting a force against said retainer in opposition to said thermostat.

6. A thermostatically controlled fluid mixing valve of the reciprocating type comprising, a casing formed with a fluid mixing chamber therein and relatively aligned fluid inlet ports opening into said chamber from opposite ends thereof, said casing also having an outlet port opening from said chamber between said inlet ports, a valve plunger extending between and having its opposite ends slidably supported in said respective inlet ports, valve plugs carried by said plunger for cooperation with said respective inlet ports, said plunger being formed with an axial slot therethrough between said plugs and an axial bore opening through one end thereof into communication with said slot, an adjusting screw rotatably threaded into said casing and slidably projecting through said bore into said slot, and a retainer rotatably carried by said screw in said slot for axial adjustment in the mixing chamber, in combination with a helical bimetallic thermostat coaxially disposed on said plunger under compression between said retainer and one of said plugs, a helical balancing spring being coaxially disposed on said plunger under compression between said retainer and the other of said plugs to exert an expanding force in opposition to said thermostat.

7. A thermostatically controlled fluid mixing valve of the reciprocating type comprising, a valve casing defining a fluid mixing chamber having relatively aligned hot and cold fluid inlet ports and an outlet port respectively communicating therewith, a valve plunger extending between and slidably supported in said respective inlet ports, valve plugs carried by said plunger for cooperation with said respective ports, said plunger being formed with an axial slot therethrough between said plugs and an axial bore opening through one end thereof into communication with said slot, an adjusting screw rotatably threaded into said casing and slidably projecting through one of said inlet ports and said axial bore into said axial slot, in combination with a helical bimetallic thermostat coaxially disposed about said plunger in abutment with one of said plugs, a retainer carried by said screw and projecting through said slot into abutment with said thermostat to cause axial movement of said plunger in one direction responsive to axial expansion of said thermostat, and means exerting a resilient force against said plunger in opposition to the expansion of said thermostat to move said plunger in the opposite axial direction responsive to contraction of said thermostat.

8. A thermostatically controlled fluid mixing valve of the reciprocating type comprising, a valve casing defining a fluid mixing chamber having a relatively aligned hot and cold fluid inlet ports and an outlet port communicating therewith, a valve plunger extending between and slidably supported in said respective inlet ports, valve plugs carried by said plunger for cooperation with said respective ports, said plunger being formed with an axial slot therethrough between said plugs and an axial bore opening through one end thereof into communication with said slot, a retainer support carried by said casing and projecting through said bore into said slot, and a normally axially stationary retainer carried by said support and projecting radially from said slot, in combination with a helical bimetallic thermostat coaxially disposed about said plunger under compression between said retainer and plunger, and a balancing spring under compression between said retainer and plunger in opposition to said thermostat.

9. A thermostatically controlled fluid mixing valve of the reciprocating type comprising, a valve casing defining a fluid mixing chamber having relatively aligned hot and cold fluid inlet ports and an outlet port communicating therewith, a valve plunger extending between and slidably supported in said inlet ports for cooperation therewith, said plunger being formed medially with an axial slot therethrough and having an axial bore opening through one end thereof into communication with said slot, a retainer support carried by said casing and projecting through said bore into said slot, and a normally axially stationary retainer carried by said support and projecting radially from said slot, in combination with temperature responsive actuating means operatively connecting said plunger and said retainer to axially adjust the position of said plunger relative to said inlet ports in accordance with the temperature of the mixed fluids in said chamber, comprising an axially expansible thermostat disposed under compression between said retainer and said plunger, and a balancing spring under compression between said retainer and said plunger in opposition to said thermostat.

10. A thermostatically controlled fluid mixing valve of the reciprocating type comprising, a valve casing defining a fluid mixing chamber having relatively aligned hot and cold fluid inlet ports and an outlet port communicating therewith, a valve plunger extending between and slidably supported in said inlet ports for cooperation therewith, said plunger being formed medially with an axial slot therethrough and having an axial bore opening through one end thereof into communication with said slot, a retainer support carried by said casing and projecting slidably through said bore into said slot, and a normally axially stationary retainer carried by said support and projecting radially from said slot, in combination with temperature responsive expansible and contractible actuating means operatively connecting said plunger and said retainer to axially move said plunger in one direction responsive to expansion of said actuating means, and resilient means disposed to move said plunger in the opposite direction responsive to contraction of said actuating means.

11. A thermostatically controlled fluid mixing valve of the reciprocating type comprising, a valve casing defining a fluid mixing chamber having relatively aligned hot and cold fluid inlet ports, a valve plunger extending between and slidably supported in said inlet ports for cooperation therewith, said plunger being formed with an axial bore therein, and an axial slot formed through said plunger and communicating with said bore, a normally axially stationary element carried by said casing and projecting through one end of said plunger into said bore, in combination with temperature responsive expansible and contractible actuating means associated with said plunger exteriorly thereof, means disposed through said slot and operatively connecting said actuating means to said stationary element to cause axial movement of said plunger in one direction responsive to expansion of said actuating means, and resilient balancing means disposed to move said plunger in the opposite direction responsive to contraction of said actuating means.

12. A thermostatically controlled fluid mixing valve of the reciprocating type comprising, a valve casing defining a fluid mixing chamber and a threaded bore opening thereinto, a ported fitting removably threaded into said bore to define a fluid inlet port concentric therewith, said casing being formed with another fluid inlet port opening into said chamber in axial alignment with said first mentioned port, a valve plunger extending between and slidably supported in said respective ports for cooperation therewith, said plunger being formed with an axial bore opening through one axial end thereof toward said fitting and an axial slot formed medially through said plunger and communicating with said bore, a normally stationary element carried by said fitting and projecting into said bore, in combination with temperature responsive expansible and contractible actuating means operatively carried by said plunger exteriorly thereof and operatively connected to said stationary element through said slot to cause axial movement of said plunger in one direction responsive to expansion of said actuating means, and resilient balancing means disposed to move said plunger in the opposite direction responsive to contraction of said actuating means.

ELMER C. BENTSEN.

REFERENCES CITED

The following references are of record in the file of this patent:

UNITED STATES PATENTS

| Number | Name | Date |
| --- | --- | --- |
| 593,399 | Leitch | Nov. 9, 1897 |
| 1,899,494 | Bowman | Feb. 28, 1933 |
| 1,931,896 | Henning | Oct. 24, 1933 |
| 2,021,427 | Peo | Nov. 19, 1935 |
| 2,226,200 | Donnelly | Dec. 24, 1940 |